United States Patent [19]

Black et al.

[11] 3,766,533

[45] Oct. 16, 1973

[54] PROCESSOR UTILIZING ONE HOLOGRAPHIC ARRAY AND A PLURALITY OF PHOTORESPONSIVE STORAGE ARRAYS FOR HIGH PAGING PERFORMANCE

[75] Inventors: John C. Black, Endwell; Neil N. Krewson; John B. Tait, both of Vestal; Bruce M. Updike, Endwell, all of N.Y.

[73] Assignee: International Business Machines Corporation, Armonk, N.Y.

[22] Filed: May 30, 1972

[21] Appl. No.: 257,591

[52] U.S. Cl. .. 340/172.5, 340/173 LM, 340/173 LS

[51] Int. Cl. ........................ G11c 13/04, G11c 15/00

[58] Field of Search .................. 340/172.5, 173 CC, 340/173 LS, 173 LM; 350/3.5

[56] References Cited

UNITED STATES PATENTS

| | | | |
|---|---|---|---|
| 3,660,818 | 5/1972 | Amodei et al. | 340/173 LS |
| 3,698,794 | 10/1972 | Alphonse | 340/173 LS |
| 3,296,594 | 1/1967 | Van Heerden | 340/173 CC |
| 3,253,497 | 5/1966 | Dreyer | 340/173 CC |
| 3,417,381 | 12/1968 | Sincerbox | 340/173 LS |
| 3,651,485 | 3/1972 | McDonnell | 340/172.5 |

OTHER PUBLICATIONS

Assour, J. M. et al., "A Photodetector Array for Holographic Optical Memories," in RCA Review, December, 1969; pp. 557-566.

Rajchman, J. A., "Promise of Optical Memories" in Journal of Applied Physics, Vol. 41, No. 3, pp. 1376-1383.

*Primary Examiner*—Paul J. Henon
*Assistant Examiner*—Melvin B. Chapnick
*Attorney*—John C. Black et al.

[57] ABSTRACT

In a data processing system, a holographic array is controllable to change the entire contents, or a part thereof, of a content addressable storage unit, i.e., an associative storage unit having two-state photoresponsive cells or a functional storage unit having four-state photoresponsive cells during one machine cycle. Thus information is transferred in parallel in a broad band path depending upon the size of the photoresponsive cell array, hologram efficiency, etc. During a succeeding machine cycle, the entire contents of the associative or functional storage unit may be searched in accordance with a search argument to select from the storage unit data which corresponds to the search argument. In this fashion, significant quantities of data are searched rapidly. Within the same system, the holographic array can be controlled during one machine cycle to change the entire contents of additional storage arrays which may be of the associative, functional or location addressable type. In this fashion, storage units such as microprogram control stores, operating system program stores and user application program stores can be rapidly changed, for example, a page (e.g., 2000 bytes) at a time during one machine cycle. This adds a new dimension for information transfer within high performance data processing systems. In one embodiment, read/write hologram arrays, the contents of which are selectively changeable, are utilized to provide a greater versatility and performance to system operation.

11 Claims, 10 Drawing Figures

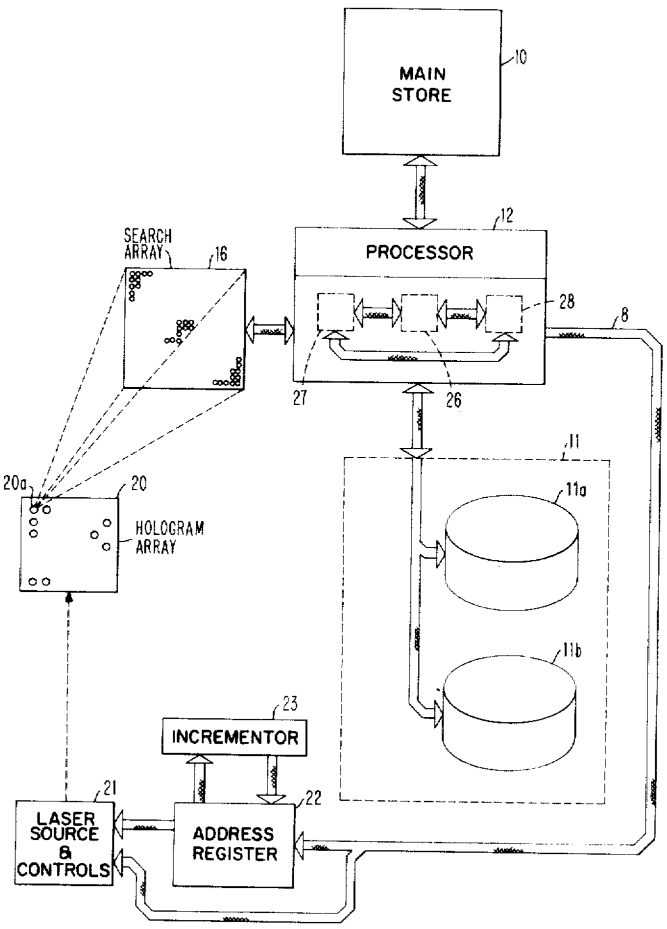
MAIN STORE
10
12
PROCESSOR
28
8
27
26
SEARCH ARRAY
16
11
20a
20
HOLOGRAM ARRAY
11a
11b
23
INCREMENTOR
21
22
LASER SOURCE & CONTROLS
ADDRESS REGISTER

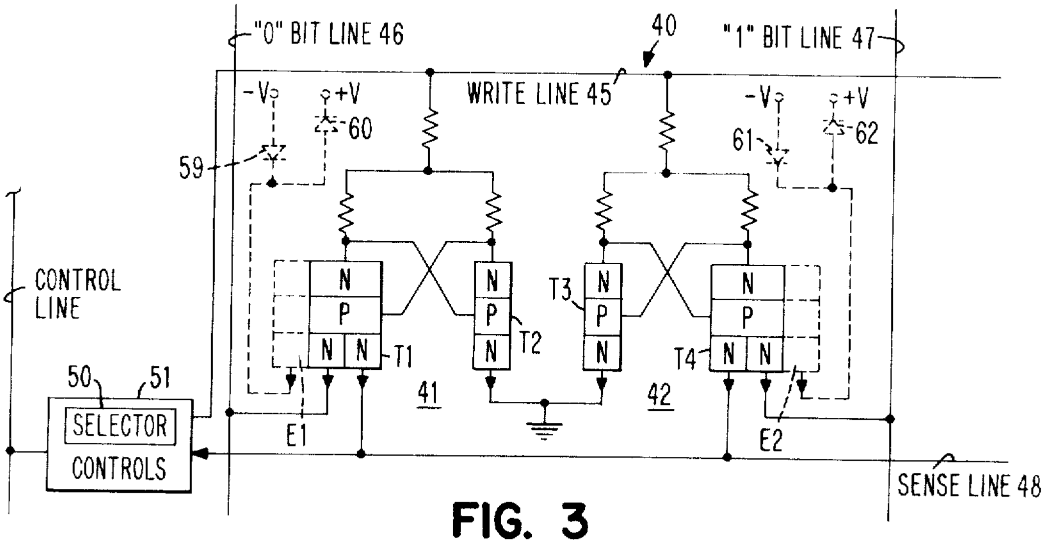
FIG. 3
| T1—T2 | T3—T4 | CELL STATE |
|---|---|---|
| ON—OFF | ON—OFF | "0" |
| OFF—ON | OFF—ON | "1" |
| OFF—ON | ON—OFF | "X" |
| ON—OFF | OFF—ON | "Y" |
FIG. 4
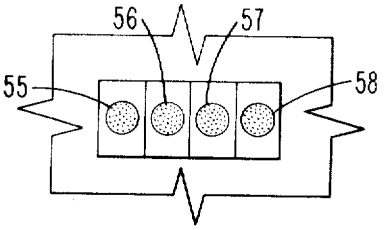
FIG. 6
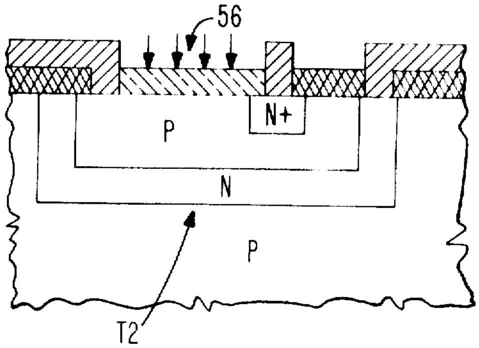
FIG. 5
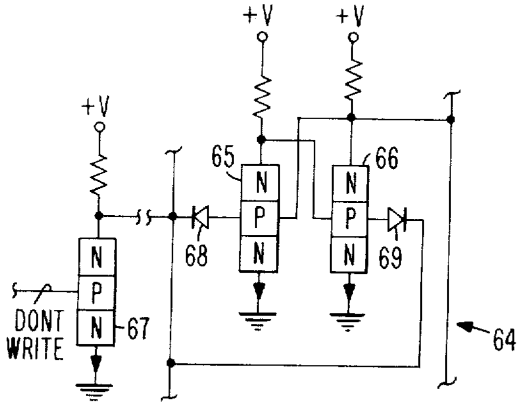
FIG. 7

PROCESSOR UTILIZING ONE HOLOGRAPHIC ARRAY AND A PLURALITY OF PHOTORESPONSIVE STORAGE ARRAYS FOR HIGH PAGING PERFORMANCE

CROSS-REFERENCE TO RELATED APPLICATION

The present application discloses subject matter specifically claimed in the present application and in a copending application, filed of even date herewith, as follows:

Copending application, Ser. No. 257,495, filed May 30, 1972, for "Processor Utilizing a Holographic Array and a Content Addressable Storage Unit for High Speed Searching," claims the broad concept of changing the entire contents of a light-responsive content addressable storage unit simultaneously by means of a holographic array and controllable coherent light source to provide improved system functions such as a high performance search mechanism, high performance associative (or functional) storage processing system, etc.

The present application has claims limited to a plurality of photoresponsive storage arrays (one, several or all of which can be content addressable) which share a single holographic array and controllable light source. Each hologram in the array includes data patterns for all (or some) of the arrays; and when a hologram is selected by the coherent light source, its resultant light pattern impinges on the photoresponsive elements of all (or several) arrays. The entire contents of each photoresponsive array are changed simultaneously only when the array is electrically conditioned for optical writing while the holographic light pattern is impinging upon the photoresponsive elements of the array.

BACKGROUND OF THE INVENTION

The invention relates to data processing apparatus wherein a holographic array is controllable during one machine cycle to change the entire contents or a selected portion of the contents of an associative or functional storage array in parallel. In the following description, the words "store, storage unit, array" and the like will be used interchangeably.

The demand for fast searching capability is expected to manifest itself in information systems of the middle and late 1970's. Historically, search mechanisms and requirements have taken a variety of forms ranging from the relatively simple table lookup operation, to more sophisticated operations with a variable increment for addressing table entries, to the variable length table lookup and finally to the search-translate-in-channel operation of the disk and channel structure of the System/360 marketed by the assignee of the present application.

Paging schemes have been implemented in which the associative arrays are employed to translate address structures.

With the advent of time sharing systems, the requirement for improved translation schemes of symbolic to actual addresses has become so evident as to suggest that future systems operate totally interpretively as opposed to the conventional background of compile, link and go.

Techniques suggested to date usually depend upon successively comparing a search argument against each entry of a search table, as well as demanding that the search table be arranged in some prescribed sequence. Maintaining such sequences is not generally too efficient when an entry is developed and must be added to the table in the proper sequence position. The table must be rearranged to accommodate the new entry. This is burdensome in a scheme such as a disk data management facility providing both sequential access and random access to a data file on a magnetic disk, where needless moving of data is to be avoided due to restart complications in case of errors.

The associative store mechanisms currently employed circumvent a part of this problem in that the entries need not be maintained in a prescribed sequence. However, they do suffer from the standpoint that to date they are refillable only in a serial fashion, e.g., a word (entry) or a few words at a time.

Another proposal is described in the Technical Disclosure Bulletin Volume 12, Number 5, pages 657, 658, published October 1969 and available from International Business Machines Corporation. In this proposal, a high speed table search utilizes a large capacity high speed read only storage unit such as a holographic array and a conventional storage unit for searching through a table. The table is arranged as a tree structure with high usage entries being assigned positions at or near the beginning of the table. However, in this proposal, refilling of the storage unit for further searching contemplates the application of holographic store data to a diode matrix and transfer, word-by-word, of the data from the diode matrix to a conventional storage unit. A word-by-word search of the storage unit is then initiated.

Another proposed solution for a search mechanism in large data base systems is illustrated in the IBM Technical Disclosure Bulletin, Volume 13, Number 9, pages 2674–2676, published February 1971. In this proposal, the search time is reduced by making use of shift register buffers and associative arrays for making key searches for information stored in disk units.

All of the known suggested solutions are still considered to be completely unsatisfactory as a long-term solution to the search problem. In each and every instance, the amount of time required to make searches through large data base systems is invariably too long.

SUMMARY OF THE INVENTION

It is therefore an object of the present invention to provide a highly efficient means for searching through very large data base systems.

It is another object of the present invention to provide a high performance data processing system making use of holographic and photoresponsive storage unit techniques.

It is a more specific object of the present invention to provide means for performing major functions required by future systems in a more efficient manner. Some of these functional requirements are:

1. Large capacity and very high performance search for data base systems;
2. Interpretive command structure operations;
3. Associative capabilities for logical operations (e.g., add, subtract, translate) tables and code blocks for control and operating programs; and
4. Modification of the system due to application, programming or engineering change requirements.

In one preferred embodiment of the invention, a data processing system is provided wherein an associative (or functional) search array, an operating system program storage unit, a user application program storage unit, and a plurality of microprogram storage units (each associated with a respective subprocessor within the system) have their entire contents changed when desired by a single holographic storage array. Each of the subprocessors are of a conventional type except that the associated microprogram storage is comprised of bistable cells, each of which is responsive to light patterns from the holographic array for changing of the entire contents (or portions thereof) of the storage during one processor cycle. The holographic array is also selectively operable to change during one cycle the entire contents (or portions thereof) of the other storage units.

System control and resource allocation circuits of known type are utilized to control the overall operation of the system and assign various tasks to the processors under program control. In addition, these circuits, together with an address register, selectively control the laser source and associated holographic array to change the contents of the various storage units as desired. Since only one machine cycle is required for changing the entire contents of the various stores, a very high speed paging mechanism is provided.

This permits the use of a reasonably low capacity main storage unit associated with the subprocessors without degradation in performance. In fact, performance is substantially increased over that of existing systems with a relatively large main storage unit.

In another embodiment, a read/write holographic array is provided which permits efficient updating of records in the array and provides means for modification of the system due to application, programming or engineering change requirements. In this embodiment an electro-optical aperture plate is provided for writing data into each of the holograms in the array. The aperture plate stores data which is arranged in conventional word format. A register coupled to the system data bus accepts data word by word and enters it into the aperture plate. When the entire aperture plate has been filled, the laser source is controlled to transfer the data from the electro-optical aperture plate to a selected hologram in the array under the control of the systems control and resource allocation circuits.

In the preferred embodiment each of the cells of the associative or functional array are of a conventional circuit type made, for example, from bipolar transistors or field effect transistors. Each of the cells which store a bit of data in an associative storage unit comprises a bistable transistor circuit. The bistable circuit comprises, for example, at least a pair of transistors, the base, collector electrodes (or gate electrodes) of which are cross-coupled to each other to provide the latchback connections. In order to render this otherwise conventional bistable latch responsive to light patterns from the holographic array, the base electrodes (or gate electrodes) of the cross-coupled transistors (or the electrodes of other semiconductor devices associated with the bistable latch) are exposed to the light patterns. During the fabrication of the array the upper surface of the semiconductor substrates within which the circuits are fabricated are opaque except over the base electrodes of the selected semiconductor devices. The presence or absence of a light pattern on the base electrode of a selected transistor in a bistable device (which in one form is also electrically conditioned for writing) causes the bistable device to be set in one state or the other. Similarly, in a functional array a pair of bistable devices is provided and the base electrodes of the transistors in the bistable devices are exposed to light patterns from the holographic array. Each of the two bistable devices is set into a predetermined state in accordance with light patterns received from the holographic array. It will be appreciated that, in addition to exposing the base electrodes of bistable devices to light patterns, it is also necessary to electrically activate write circuits associated with the bistable devices. Thus, if the write circuits of all devices in an array are activated, the contents of the entire array can be changed simultaneously by the holographic array. If write devices for selected portions of the array are activated at any given time, only those portions which are activated will have their contents changed by the holographic array.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 3 is a schematic diagram of one form which the cells of the functional storage units of FIGS. 1 and 2 may take;

FIG. 4 is a table setting forth the logical states of the transistors of FIG. 3 in various states of the functional cell;

FIG. 5 is a fragmentary sectional elevation view of one of the transistors of FIG. 2 illustrating the transparent surface area through which light from a hologram may be directed onto the base area of the transistor;

FIG. 6 is a fragmentary plan view of a semiconductor chip having formed thereon a functional array with transparent apertures for the transistors of the bistable pairs of FIG. 3;

FIG. 7 is a schematic diagram of a photo-responsive bistable cell used in non-associative storage arrays of FIG. 2;

DESCRIPTION OF THE PREFERRED EMBODIMENTS

Figure 1:
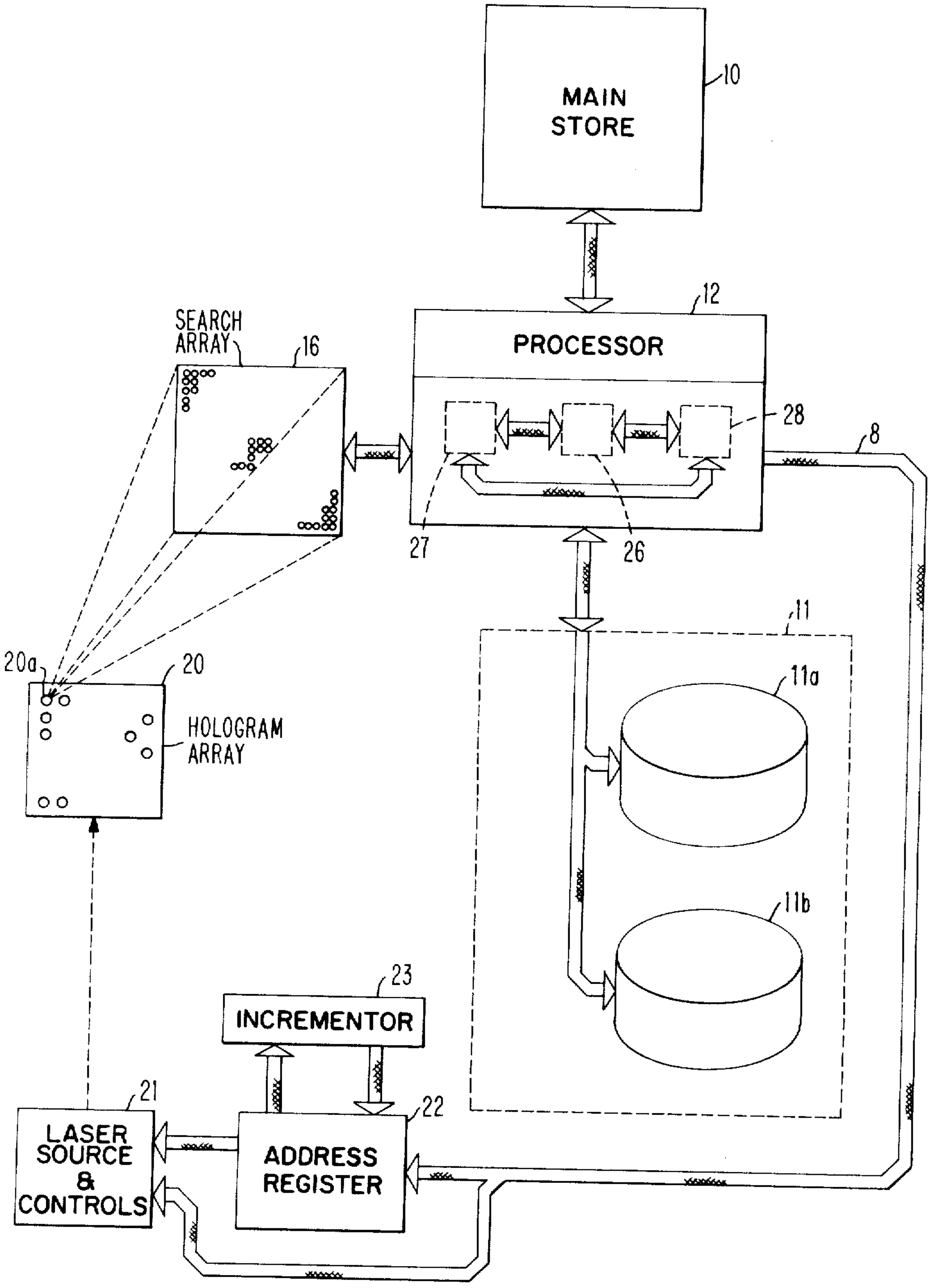
FIGS. 1 and 2 are diagrammatic illustrations of processing systems utilizing the improvement of the present application.

FIG. 1 illustrates a conventional data processing system including a main storage device 10, peripheral devices 11, including conventional magnetic disk units **11*a* and 11*b*, and a processor 12. Coupled to the system is a preferred embodiment of the improvement in the form of a large capacity, high performance search mechanism including a content addressable search array 16, a holographic array 20, a laser source and its controls 21, an address register 22 and an incrementor 23. The laser beam is controlled in accordance with address information in the register 22 to select one of the holograms 20***a* in the array 20 to cause a selected light pattern to be impressed upon photosensitive elements in the array 16 to change the entire data contents thereof simultaneously.

Each of the holograms 20*a* in the array 20 preferably stores a page of data which is equal to the total storage capacity of the search array 16. Therefore, when one hologram from the array 20 is selected and its corresponding light pattern is impressed upon the array 16, the entire contents of the array 16 will be completely changed in one system cycle time i.e., the one microsecond or less that is required by conventional commercial processors to execute one instruction under control of a series of clock pulses. Since the present state of the laser and holographic array arts are such that holograms can be selected in time periods in the order of a microsecond or less, the entire contents of a content addressable array such as 16 can be changed in that time period. Since content addressable arrays are searched in one cycle time, that is, all data word entries within the array are searched in parallel simultaneously, it is possible with an otherwise conventional system to change the entire contents of the array 16 (for example, several thousand word entries) in one system cycle time and then search all of the words for desired data in the next cycle time. Thus two cycles (or subcycles) of processor 12 are all that are required to search several thousand words.

In conventional processing systems having mass storage of data in magnetic disk equipment such as 11*a* and 11*b*, many schemes have been proposed to increase the efficiency of locating data on the disk units. One of the commonly used methods is to create a directory or index file which stores the symbolic names of data sets and their respective addresses on the disks. However, in large systems, the size of these directories or index files is so large that they must be placed on the disks. As a result, the time required to determine the addresses of desired data sets on the disks is undesirably long. Suggestions have been made to store the directories in semiconductor storage units, and in particular, associative storage units of the semiconductor type. However, the required size of the storage unit for storing the directories is such that it becomes uneconomical. The improved high speed search apparatus described above provides an economically feasible high storage capacity arrangement for storing and searching substantial amounts of frequently used data such as are required for directories, tables, control program segments and the like.

When the conventional processing system of FIG. 1 reaches a point during program execution where the processor determines that a desired set of data stored on one of the disk units 11*a* or 11*b* is required, it will initiate a directory search for the location of the data set. In the simple embodiment of FIG. 1, the search involves the entry into the address register 22 of an address value which causes the laser source 21 to select a first hologram 20*a* in the array 20. This address is entered into the register 22 by the processor 12 over an address bus 8. The page of data in the first hologram 20*a* is entered into the array 16. The processor 12 causes a parallel search of all of the entries in the array 16 during the next cycle according to the search argument entered into the mask register preferably prior to changing the array contents.

In the event that the desired entry is not found in the array 16, the processor 12 causes the incrementor 23 to receive, increment and return the address in the register 22, thereby causing the laser source 21 and its controls to select the next hologram in the array 20. This causes the data corresponding to the second hologram to be entered into the search array 16. During the next cycle, the processor searches the new entries in the array 16 simultaneously.

This sequential process continues until the desired entry is found in the array 16. This entry is then used by the processor 12 in a well-known manner to select the desired data in the disk unit 11*a* or 11*b*. Preferably, the holograms are arranged for selection in the order of frequency of use. It will be appreciated that this process of searching for the desired address can, in a conventional multiprogramming environment, be interleaved with other tasks.

It will be appreciated that the system illustrated diagrammatically in FIG. 1 can be modified in many ways by those skilled in the art without departing from the invention. For example, several search arrays 16 operated independently or in parallel as one unit may be provided, each having a holographic array 20 and light source 21.

As will be explained later, several arrays 16 can be served by one holographic array and light source. In this manner, one hologram is used to change the entire contents of a plurality of arrays such as 16.

The hologram array 20 and laser source 21 can also be utilized to change the entire contents of storage units other than content addressable storage units. For example, the contents of a semiconductor control store of a data processing system can be changed in one processor cycle time by means of an arrangement such as photoresponsive cells in the control store, the array 20, the laser and its controls 21, and the address register 22. All or large segments of a microprogram control store of known processing systems, such as that shown in U.S. Pat. No. 3,478,322, can thus be changed rapidly.

The improvement of the present application can be used to modify and improve the performance of associative array data processors such as that shown in U.S. Pat. No. 3,585,605 to P. A. E. Gardner et al. This patent shows a system including three associative stores 26, 27, 28 (illustrated in broken lines in FIG. 1), the contents of which can be changed optically by holographic arrays as described above to enhance performance. A working store 26 stores tables to perform arithmetic and logic functions. The other stores are an operand store 27 and a control store 28. A laser-hologram arrangement such as 20, 21 can be used in the patented system to change table content of the working store 26 (thereby changing the arithmetic and logic functions) or to change control store content to perform different routines. Since changing of entire stores is achieved in one cycle time, dynamic restructuring of the machine during program execution is possible and electronic store capacity requirements can be minimized without sacrificing performance. As will be seen during the description of FIG. 2, one hologram-laser arrangement can be shared by several stores.

Some variations will be described as a part of the improved system applications illustrated in FIGS. 2 and 8, which will be described below. Similar parts of the system are identified by the same reference numerals.

Figure 2:
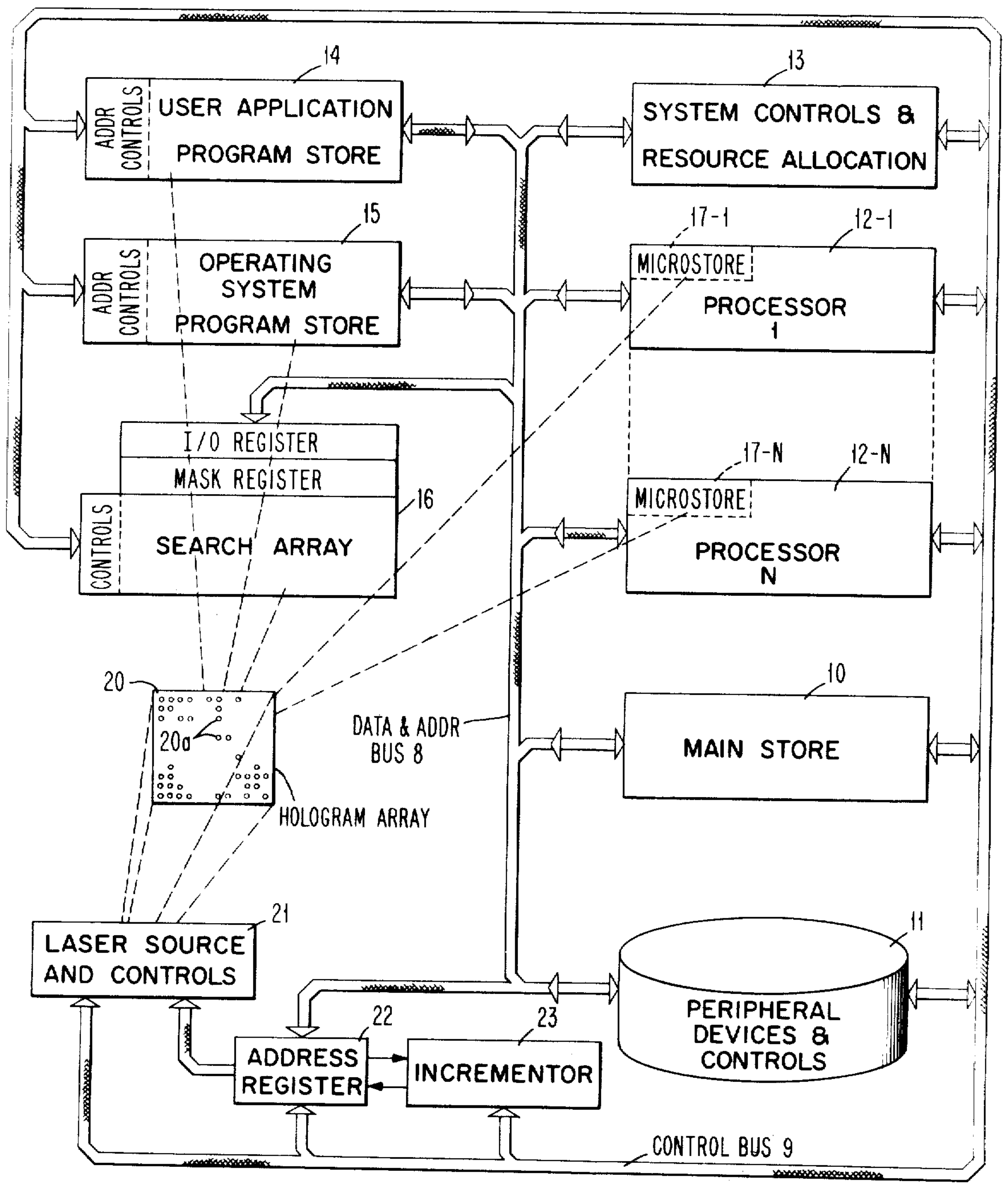

The system of FIG. 2, which is shown diagrammatically, includes a conventional main storage device 10, peripheral devices 11, and a plurality of processors 12-1 to 12-N coupled to a data and address bus 8 and a control bus 9. A systems control and resource allocation circuit 13, a user application program storage unit 14, an operating system program storage unit 15, and an associative (or functional) search array 16 are also connected to the buses 8 and 9. The control of multiple processors with multiple main store units is known in the art (e.g., U.S. Pat. Nos. 3,480,914; 3,496,551; 3,566,363) and will not be explained in detail.

Each of the processors 12-1 to 12-N has associated therewith a corresponding microprogram storage unit 17-1 to 17-N for controlling the operation of the processor in a well-known manner. Except for the photoresponsive cells of the storage units 17-1, 17-N, each of the processors 12-1 to 12-N are generally of any known type using microprogram execution, for example that shown in U.S. Pat. application of Carnevale et al., Ser. No. 29,223, filed Apr. 16, 1970, issued Apr. 11, 1972, as U.S. Pat. No. 3,656,123.

Each of the storage units 14, 15, 16 and 17-1 to 17-N is preferably of the type which has associated therewith photoresponsive means whereby the entire contents of each of the storage units can be changed during one machine cycle by means of an associated holographic array 20 and its laser source 21. A preferred form of the circuits for the various storage units will be described in more detail below with respect to FIGS. 3–7. For the moment it will be understood, however, that electrical controls are activated in each of the storage units when it is desired to change the contents thereof by means of the holographic array, and at the same time the laser source is controlled to select a desired hologram in the array 20.

Each hologram 20*a* in the array has superimposed thereon, a different pattern for each storage unit 14, 15, 16 and 17-1 to 17-N. In the preferred embodiment, the patterns of the selected hologram are impressed simultaneously upon the storage units 14, 15, 16 and 17-1 to 17-N; and that one (or more) storage unit which has been electrically activated has its contents changed in accordance with the pattern data in the hologram.

An address register 22 and an associated incrementing circuit 23 are provided for controlling the laser source and its controls to select the desired hologram in the array 20.

In the embodiment illustrated in FIG. 2, it is contemplated that the systems controls and resource allocation circuits 13 will be operated under control of a master control program to assign selected tasks to the processors 12-1 to 12-N for executing customer programs in a manner generally used in present apparatus of the multiprocessing (and multiprogramming) type. In this type of environment the individual processors handle tasks under control of the circuit 13; and the various resources such as the peripheral devices 11 are assigned as tasks are created. In a single processor, multiprogram environment, controls equivalent to those in circuit 13 are included in the processor and are activated by the system control program.

In present day systems the main store 10 is used for storing user application programs, operating system programs and various tables and customer data. Even in large systems which have main storage units with storage capacity in the order of a million bytes (8 binary bits per byte) there is not sufficient storage capacity to hold simultaneously the operating system, the customer application programs and the various customer data and tables. As a result, it is common in present day systems to "swap" pages (e.g., 2,000 bytes) of data between main storage and peripheral devices 11 such as magnetic disks. This continuous swapping of pages between main store and peripheral devices 11 is one of the main sources of system inefficiency.

One of the features of the present invention is the provision of means including the holographic array and its associated storage units to minimize the time required for such paging operations. In the preferred form of the invention the holographic array will include the very high usage system control program segments which can be paged from the holographic array 20 to the operating system store 15. In addition, in many customer installations which have certain application programs with a high frequency of use, the storage unit 14 will be used to receive from the array 20 application program segments having the highest frequency of use. In customer applications having tables (e.g., insurance rate tables) with high frequencies of use and/or index search requirements for large data bases, the associative search array 16 will be used in conjunction with the array 20 for rapid paging and searching of these tables and data base indexes which have a high frequency of use.

In many customer installations, programs are written specifically for different types of older machines which are no longer in use. Frequently, instead of rewriting the programs in a machine language which is intended for a newer system, the customer instead will make use of emulator techniques to execute the programs in their original language. One common method for emulating programs in a language foreign to the machine is to make use of a different set of microprogram routines for each language type. Consequently, the microprogram storage units 17-1 to 17-N associated with each of the processors 12-1 to 12-N are adapted to have their entire contents changed during one cycle time by means of the holographic array whereby they can make use of the particular set of microprogram routines (or a portion thereof) which is required for the particular language of the program or task being executed by the associated processor.

This provides very high performance in a system such as that described in U.S. Pat. No. 3,478,322 issued Nov. 11, 1969, to B. O. Evans, which patent suggests an electrically writeable control store changeable by control data from a disk store for emulating different languages. In the system of FIG. 2 herein, the same or different languages can be emulated concurrently in the processors 12-1 to 12-N.

In addition, the storage units 17-1 to 17-N do not require a capacity large enough to store all routines of a set since subsets can be paged in during one machine cycle time without noticeable degradation in performance.

It will be appreciated that multiple stores such as 14 and 15 can be provided, for example one for each processor 12-1 to 12-N. This permits the allocation of one of the processors to each active customer program and an active control program segment for that customer program.

Details of the semiconductor array cells will now be described. The search array 16 (FIG. 1), except for being photoresponsive, is preferably one of several wellknown types of content addressable arrays, for example the bipolar transistor array of U.S. Pat. No. 3,609,702, of P. A. E. Gardner et al or the field effect transistor associative array of copending U.S. application Ser. No. 197,908, filed Nov. 11, 1971, in the name of J. Dailey et al. In FIG. 2, the array 16 is electrically as well as optically controlled for writing a page of data therein.

One preferred form of a multi-stable cell 40, FIG. 3*a*, used in the functional array 16 of FIG. 1 will be described with respect to FIGS. 3*a* and 4–6 inclusive. The cell 40 is the same as that illustrated in the Gardner et al patent and described in greater detail in U.S. Pat. Nos. 3,531,778 and 3,543,296; and the cell will be described only briefly herein. The difference between the cell of the present disclosure and that of the Gardner et al patent is the exposure to light patterns of the base area of the transistors in the cell. It will be appreciated that other known associative and functional array cells can be provided to achieve the improved results of the present application.

The storage cell 40 of FIG. 3 is structured to provide at least three discrete states, i.e. "0, 1, and X." A typical arrangement provides four states, 0, 1, X and Y, by using two binary triggers (or bistable devices) 41, 42; however, the fourth state Y is not normally used.

The bistable device 41 is comprised of cross-coupled transistors T1 and T2 which form a latch; and the bistable device 42 comprises a pair of cross-coupled transistors T3 and T4. The conducting and nonconducting states of the transistors T1 – T4 for each of the cell states 0, 1, X and Y are illustrated in FIG. 4. Since the cell state Y is not used, it will be apparent from the description below that the 0 state is represented by the conducting state of the transistor T1, the 1 state by the conducting state of the transistor T4, and the X state by neither T1 nor T4 being in the conducting state. As will be seen below, this representation is the result of bit lines 46, 47 being connected only to the transistors T1 and T4 for writing, searching and sensing data. The cell states can be sensed (select function) merely by examining the transistors T1 and T4 since the X state is a "don't care" condition. The transistors T1 and T4 each have two emitters; one connected to a bit line 46 or 47, the other to a word line 48.

There is a separate level control for each of the bit and word lines 46, 47, 48 connected to the cell and for the line 45 supplying excitation for powering the storage cell. These level controls are for changing the information stored in the cell and for determining what information is stored in the cell. They are also used for allowing or preventing the cells to be set by an optical signal of photon injection to the base area of the cell structure.

As explained more fully in the Gardner et al patent, a read operation requires raising (positive) of the voltage on the line 48 which causes appropriate logical 1 or 0 signals to be applied by the transistors T1 and T4 to the bit lines 46, 47.

To electrically write information into the cell 40, appropriate logical signals are applied to the bit lines 46 and 47, the voltage on the line 45 is lowered, and the voltage on the line 48 is raised. This will result in the logical 1 or 0 signals applied to the bit lines 46 and 47 to switch the bistable devices 41 and 42 into states corresponding to the logical signals.

To perform a search or select cycle, the search argument signals are applied to the bit lines 46 and 47. The sense line 48 is normally maintained at ground potential, and the logical signals on the lines 46, 47 are either passed to the sense line 48 or blocked by the bistable devices 41 and 42, i.e., the conducting or nonconducting states of transistors T1 and T4.

When the search array 16 is the only array used in conjunction with the holographic array 20 in a system (e.g., FIG. 1), then merely optical energization of the cells is required for writing the data into the array. In such an event, the light patterns are directed to impinge on the base areas of the transistors T1, T2, T3 and T4. Lines 46, 47 and 48 are at ground potential and line 45 at the normal positive level. When light with sufficient energy level impinges on one of the base areas, it causes sufficient carriers to be generated in that base to cause the respective transistor to turn on and the cross-coupled transistor to be turned off. In this manner, writing of the entire array is achieved optically without electrical energization of the bit lines such as 46 and 47 or switching of the voltage levels on the word lines such as 45 and 48. The switching of the cells is provided by the absorption of photon energy in the energy absorption band of the energy frequency spectrum of the base areas in the cells.

FIGS. 5 and 6 show a preferred method of providing the optical input to the cell 40. The cell structure is arranged to allow the incident radiation to fall on the base areas of the transistors T1, T2, T3, T4 to selectively turn "on" the transistors via apertures 55–58.

This method uses the intrinsic capability of the transistor base area to convert the photon energy of the light spot to a current flow which turns on the irradiated transistor. The use of the storage transistor itself to convert the light energy and store bit status is the most efficient method of device utilization. The photon energy can also be used to set the gate electrodes of insulated gate field effect transistors (FET) in an FET memory embodiment (not shown).

The basic idea is to use the photon energy from the optical signal to turn on the proper transistor in the cell independent of the transistor material, configuration or arrangement. The silicon materials and processes used in fabricating transistor devices today are nicely matched to acceptance and conversion of the photon energy from the optical signal to the electrical current flow required to turn on the desired storage transistors.

However, in systems such as that illustrated specifically in FIG. 2 where the holographic array 20 is utilized in conjunction with a plurality of storage units 14-16 and 17-1 to 17-N, it is necessary to condition electrically the storage unit 16 (as well as units 14, 15 and 17-1 to 17-N) before the light patterns are directed to impinge upon the photosensitive elements in the storage cells.

One method of permitting this coincident optical and electrical selection for changing the contents of array 16 involves adjustment of the level of photon energy and the level of conduction in the cell in a manner similar to that employed for electrically writing into the cell. The level of photon energy injected into the base areas is such that it will not produce sufficient current to switch the state of the cell 40 when the cell is in the static state, e.g., lines 46, 47, 48 are at ground potential and line 45 at the normal positive potential. However, if the cell 40 is set in the electrical WRITE state (e.g., the level of line 48 is raised (positive) and the level of line 45 is reduced to a lower positive level) and bit lines 46, 47 are clamped at ground potential, the injection of the photon energy into the base area of selected transistors T1 to T4 will cause proper switching of the cell state.

FIG. 3 illustrates by means of dashed lines a second method for requiring both optical and electrical control to switch the state of cell 40. In this form, additional emitter electrodes E1, E2 in transistors T1, T2 and photodiodes 59–62 are provided.

In order to prevent the cell 40*a* of the array 16 (FIG. 2) from being changed by light patterns from the holographic array 20, the potential level on the line 48 is lowered from ground potential to a slightly negative potential. This negative potential on line 48 isolates the cell 40*a* from the diodes 59–62. Similarly, all cells 40*a* in the array 16 are inhibited from change when the holographic array writes into one (or more) of the other arrays 14, 15, 17-1 to 17-N.

To write into array 16 via holographic array 20, the potentials on lines 45, 48 are lowered and raised respectively as described above. The diodes 59–62 respond to the light patterns to couple positive or negative potentials to E1, E2 to set cell 40*a* according to the optical pattern.

More specifically, light impinging on diode 59 operates the diode in its low impedance state coupling a negative potential to emitter E1 turning T1 on and T2 off. Light impinging on diode 60 couples a positive potential to E1 turning T1 off and T2 on. Similarly, light impinging on diodes 61 and 62 respectively turn T4 or T3 on.

FIG. 7 illustrates a conventional bistable device 64 which can be used in the cells of storage units 14, 15 and 17-1 to 17-N. The device includes cross-coupled transistors 65 and 66. A transistor 67 has its output coupled to the base electrodes of transistors 65, 66 via photodiodes 68 and 69 (as well as to the other cells of the particular storage device).

When it is desired to write into the storage device (of which cell 64 is a part), the DON'T WRITE signal is removed from the base electrode of the transistor 67, applying a positive potential to the diodes 68, 69. The diodes are reverse biased and therefore nonconductive. However, if light from the holographic array impinges on diode 68 or 69, it will operate in its low impedance region, coupling the positive potential to the base electrode of the transistor 65 or 66 turning that transistor on.

The bistable device is merely the bit storage portion of the cell of the storage array. It will be appreciated that additional cell circuits are required for addressing and sensing the cell. However, these are well known in the art and will not be described further.

It will be appreciated that the arrays 14, 15 and/or 17-1 to 17-N can be associative arrays, in which event their cells are of the type shown in FIG. 3.

A brief description of one sequence of operations of the system of FIG. 2 will be given by way of example, reference being directed to the timing chart of FIG. 8. The description is limited to the operation of those components of the system which comprise the improvements herein.

When reference is directed to paging-in segments of the operating system, these segments are the ones which are normally paged in and out as opposed to those segments which are typically left permanently in main store. For example, the nucleus of the operating system supervisor (which is maintained permanently in a portion of main store in conventional systems) is similarly maintained in main store 10 of FIG. 2 and is accessed in the normal manner by the processors 12-1 to 12-N and the system controls and resource allocation circuits 13.

At some point in the operation of the system of FIG. 2, the processing of a new customer program is initiated by a job control program in a known manner. It will be assumed that the system controls 13 allocate one of the processors, for example 17-1, to the new customer program and that the arrays 14, 15 and 16 will be utilized to page in selected portions of the application program, the operating system control program and various search data respectively. Attention is directed to FIG. 8 for the sequence of operations of those components of the system of FIG. 2 which comprise the improvements herein.

Figure 8:
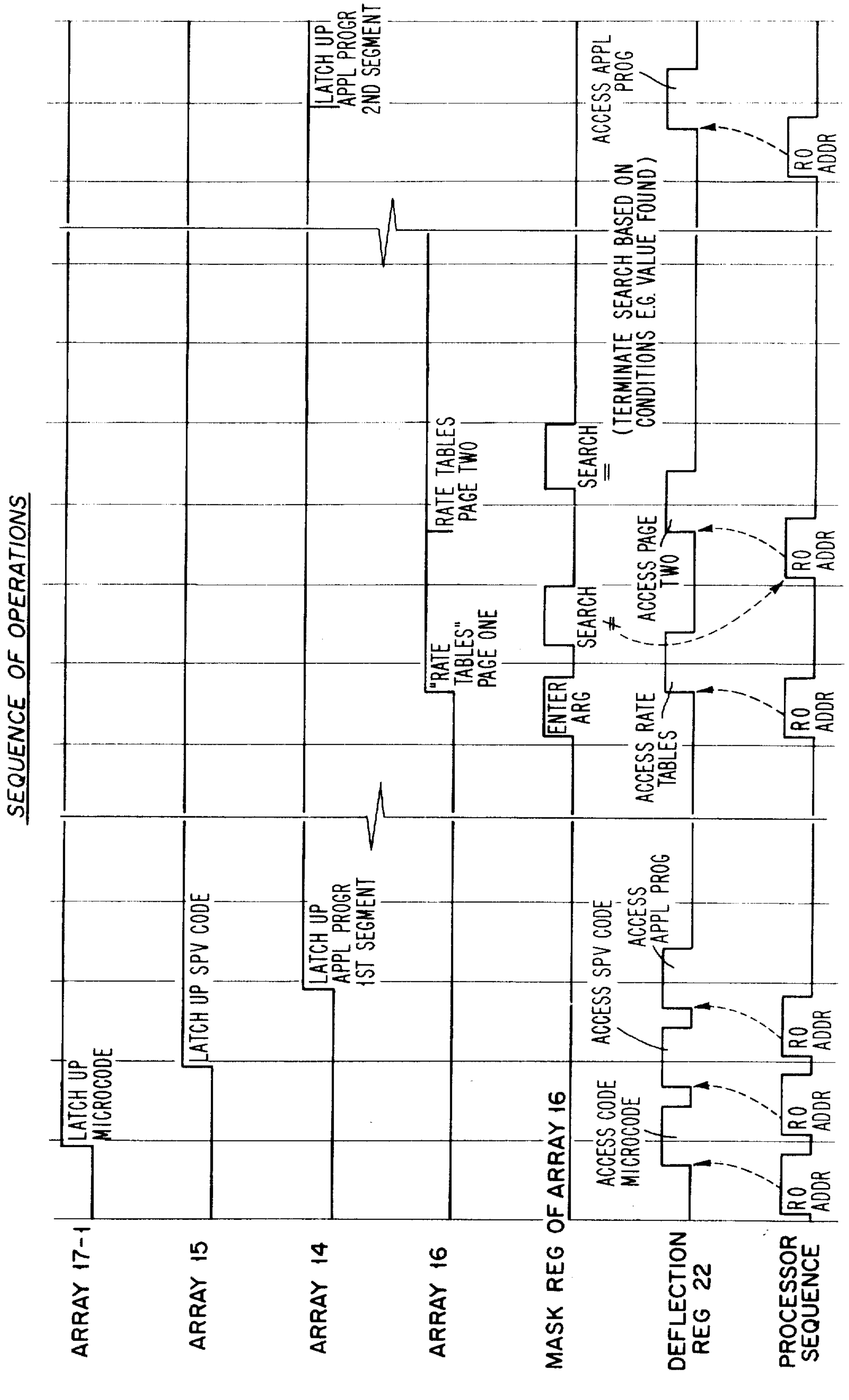
FIG. 8 is a timing diagram illustrating one manner in which the system of FIG. 2 may be operated in accordance with the teachings of the present invention.

With respect to FIG. 8, it will be seen that the system controls 13 initiate three succeeding machine cycles for initially loading the arrays 17-1, 15 and 14 with required information. During the first cycle of operation, the system controls 13 load the deflection address register 22 with an address corresponding to one of the holograms 20*a* which contains therein data corresponding to a required microprogram routine. After the address register 22 is loaded, the system controls 13 cause the laser source 21 to be deflected to the appropriate hologram location 20*a* in the array 20 and to cause the light patterns from the hologram to impinge upon the arrays 14, 15, 16, and 17-1 to 17-N. The system controls 13 also address the microstore 17-1 and render it active for optical writing by electrically energizing the cells of the store as described above to cause an entire page of microprogram code to be latched up into the store 17-1.

During the second machine cycle, the system controls 13 load the address register 22 with the address of the hologram containing the desired segment of operating system code. The system controls 13 address and render active the store 15 so that the desired page of operating system code is latched up in the array 15.

During the third machine cycle, the system controls 13 address and render the array 14 active and enter into the address register 22, the address of the hologram having the desired user application program code. Thus after three cycles of operation, the controls 13 have loaded the initial code required for execution of the user program.

At some point during the operation of the application program, a need for a particular rate table data is required. At this point in time, the system controls 13 will load into the address register 22, the address of the hologram 20*a* which includes the first page of the rate tables. The controls 13 cause the laser source and controls 21 to select the desired hologram and cause the light pattern from the hologram to impinge upon the arrays 14, 15, 16 and 17-1 to 17-N. At the same time, the system controls 13 address and render the search array 16 active causing the first page of the rate tables to be latched up in the array.

The search argument, (e.g., the name or key of the desired data) is entered into the mask register of the search array 16 preferably during the same machine cycle as the loading of the first page of the rate tables into the array 16. It will be appreciated, of course, that this search argument can be entered into the mask register as desired in a preceding or succeeding machine cycle.

It is assumed in the illustration of FIG. 8 that the desired rate table information is in page 2 of the tables. Thus during the next succeeding machine cycle of operation, when a search is made in page 1 of the rate tables for the desired information in the array 16, a mismatch occurs. The system controls 13 respond to the mismatch condition to cause the incrementor 23 to increment value in the address register in 22 by one to select the page 2 of the rate tables. The laser source and controls 21 and the array 16 are rendered effective to select the proper hologram 20*a* and enter the corresponding data (page 2 of the rate tables) into the search array 16. A search is made of page 2 of the rate tables using the search argument in the mask register. In this instance, a match is found, and the search is terminated.

Processing continues until a new segment of the user application program is required, at which time the address of the hologram having this data is entered into the address register 22. In the manner described above, the next section of the user application program is transferred from a selected hologram 20*a* into the store 14 for continued processing.

It will be appreciated that during the processing of the customer program, the need for additional microprogram routines is very likely to be evidenced, and cycles not described above are taken to replace the contents of the microprogram store 17-1 as required. It will be appreciated that in high level programming language systems, e.g., S/360 APL, extensive processor interpretation is done at program execution time, requiring the search and access of tables of information necessary to complete the high level command. This invention provides a fast search and retrieval scheme for extensive interpretive command structure operations. Similarly, the contents of the operating system program store 15 will require replacement during the processing of typical customer programs.

It will be appreciated that the main store 10, controls 13 and the peripheral devices 11 are accessed during the execution of the customer program. These accesses are not depicted in FIG. 2 but can be considered as interleaving with various operations of the type shown and depicted in FIG. 8. It will also be appreciated that in a multi-tasking environment, various tasks are created during the execution of a customer program. The system controls 13 will allocate resources and the processors 12-1 to 12-N for executing various tasks in a known manner. As the processors are allocated, their microprogram stores 17-1 to 17-N are loaded (and altered when required) from the holographic array 20.

Figure 9:
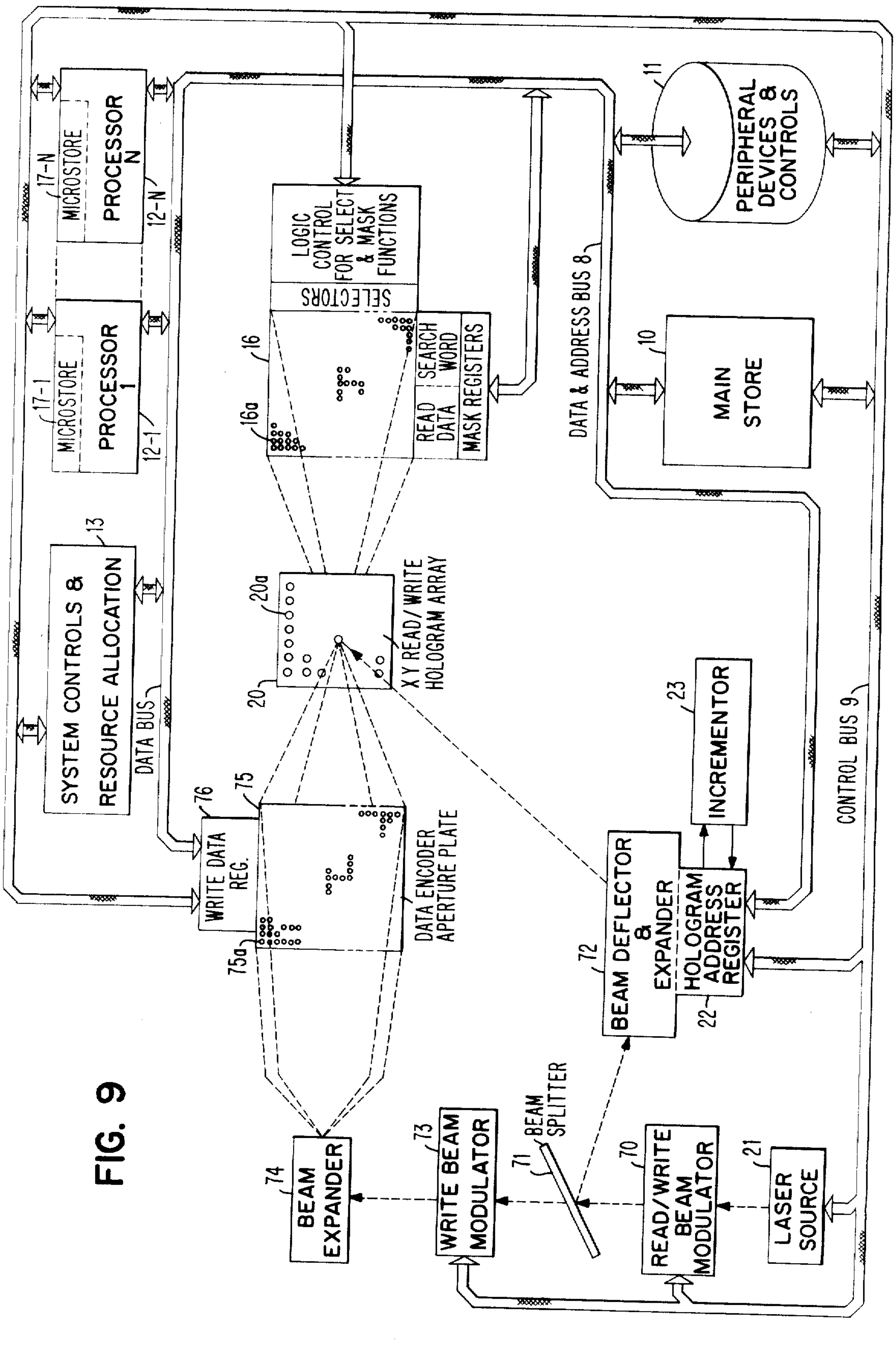
FIG. 9 is a diagrammatic illustration of a third embodiment of a system incorporating the teachings of the present application.

FIG. 9 illustrates a system somewhat similar to that of FIG. 2 and the same reference numerals are used for corresponding functional devices. Thus the system of FIG. 9 includes a main store 10, peripheral devices 11, processors 12-1 to 12-N, system controls 13, an address register 22 and its incrementor 23, all interconnected by the data and address bus 8 and control bus 9 for processing data under program control in a known manner.

However, FIG. 9 illustrates diagrammatically a read/write form of holographic array system whereby the data contents of the array can be changed as required. In the typical application, data frequently used for a particular program(s) is transferred from the mass storage provided by slow speed devices 11 to the holographic array 20 for fast reference thereto each time it is thereafter required. In addition, the improvement of FIG. 9 provides a means for updating data stored in the array 20.

The individual components illustrated to provide the read/write function is of a known type and will be described only briefly. A suitable alternative read/write apparatus is disclosed in U.S. Pat. No. 3,631,411 issued Dec. 28, 1971, to W. F. Kosonocky.

The read/write apparatus of FIG. 9 includes the laser source 21 and a read/write holographic array 20. A read/write beam modulator 70, a beam splitter 71, a beam deflector and expander 72, a write beam modulator 73, a beam expander 74, and a data encoder and aperture plate 75 cooperate to transfer data, a page at a time, from the plate 75 to the array 20. A write data register 76 transfers data a word (or other suitable width) at a time from the data bus 8 to the plate 75.

The function of the read/write beam modulator 70 is to provide a timed output beam when it is desired by the code on the program control bus 9 to allow a read or a code on the program control bus 9 to allow a read or a write function. The modulator 70 gates the laser beam to the beam splitter 71. The beam splitter 71 functions in the normal holographic system to provide the reference beam for writing, or the read beam for reading. The beam is further deflected by the unit called beam deflector and expander 72. The expander portion of this unit 72 is used to expand the beam just sufficiently to cover the selected hologram 20*a* in the X-Y read/write hologram array 20. When it is desired to read, the read beam is deflected to the desired hologram array position; and, through normal holographic process, projects the information on the light sensitive portions 16*a* of the associative array structure 16 shown in FIG. 9.

When it is desired to write information into the hologram array 20, the beam from the laser source 21 is modulated by the first read/write beam modulator 70 to provide the proper time signal. A portion progresses straight through the beam splitter 71, through a second write beam modulator 73 which allows the laser light signal to be expanded by the following beam expander 74 and play upon the data encoder aperture plate 75. This aperture plate 75 has dimensions identical to those of the associative array light sensitive portions 16*a* in a one-for-one relationship; that is, the X-Y dimension and delineation of sensitive spots in the read array 16 is represented by electro-optical shutters 75*a* in the data encoder plate 75. The write data register 76 activates the desired selected electro-optical shutters 75*a* to encode the data beam with the proper information to be recorded. Data is written a word (or other data width) at a time from the register 76 into the plate 75 under control of one of the processors 12-1 to 12-N; however, data is transferred from the plate 75 to the array 20 a page at a time. A second electro-optical shutter plate (not shown) could be placed immediately in front of the X-Y read/write hologram array 20; and, in a write function, only the selected X-Y hologram 20a to be written is exposed to the reference and the data beams, which will be coincident at that point in space.

This provides the function of recording the data desired onto the desired hologram 20a of the array 20 in parallel from plate 75. In a subsequent read operation, it can be read from the hologram array 20 to the associative storage unit structure 16 and searched in the parallel manner described for that function with respect to FIGS. 1 and 2.

Suitable coded signals are provided from the systems controls 13 through the control bus 9 and control wiring to provide the proper time coincidence of signals at the functional devices described.

The hologram address register 22 holds a series of addresses which cause the beam deflector 72 to select the particular X-Y hologram 20a desired from the hologram array 20 on a read function. In the read/write function, it is used in combination with the electro-optic shutter 75 to expose only the proper hologram 20a in the array 20 for writing.

The write data register 76 accepts information from the data bus 8 of the system and is used to set up the information in an X-Y manner row by row and column by column in the data encoder electro-optical devices 75a. These devices have associated with them, a bit latching storage device (not shown) for each independent bit position. The latches accept data from the write data register 76, word by word for example, and produce a raster type structure of information. Although data is assembled in a serial fashion, it can be read out all at once in a parallel fashion from plate 75 to array 20 when it is desired to perform the write function.

The diagram and this description have described one known means of encoding a single aperture plate, recording in a hologram, and reading out to a single associative memory array. It should be appreciated that one can use multiplicity of data encoder aperture plates such as 75 and a like corresponding multiplicity of associative store light sensitive arrays such as 16 so that more than one block (or page) of information can be made available on a single access to the hologram array 20. For example, four independent electro-optic aperture assemblies such as 75 (not shown) could be established in the encoder aperture plate area and a corresponding four associative (or other) read out arrays such as 16 (not shown) could be established in the read out area. This then allows each addressed hologram position in the read/write hologram to accept or deliver four pages of independent data. The four pages of data are sensed and utilized by the four independent light sensitive associative array structures as described.

The improved holographic-functional array search mechanism of FIGS. 1, 2, 9 can be used to advantage in user applications involving large data base systems such as that which will be briefly described below with respect to FIG. 10.

With the improved holographic array-associative store, the organization of data (as in a user's data files) can be more easily structured to take advantage of activity (frequency of reference), for example, even though the key (or name) of the data does not include an activity key within it. Thus, if 80 percent of the activity on a data file occurs on only 20 percent of the items (a typical inventory activity figure), we can organize the item records on the array 20 in sequence by known activity, and improve retrieval time over a sorted file (by item) organization.

Another feature provided by the present improvement is that the addition of new items to the file in devices 11 amounts to simple catenation. Similarly if a data file is maintained on a device such as a disk, and is indexed from an associative store directory, the data record may be added to the end of the data file on the disk and the index entry to the end of the associative index file. If the entire array 20 is the directory, new holograms are added (physically, or electrically if read/write) as required to extend or modify the directory.

Figure 10:
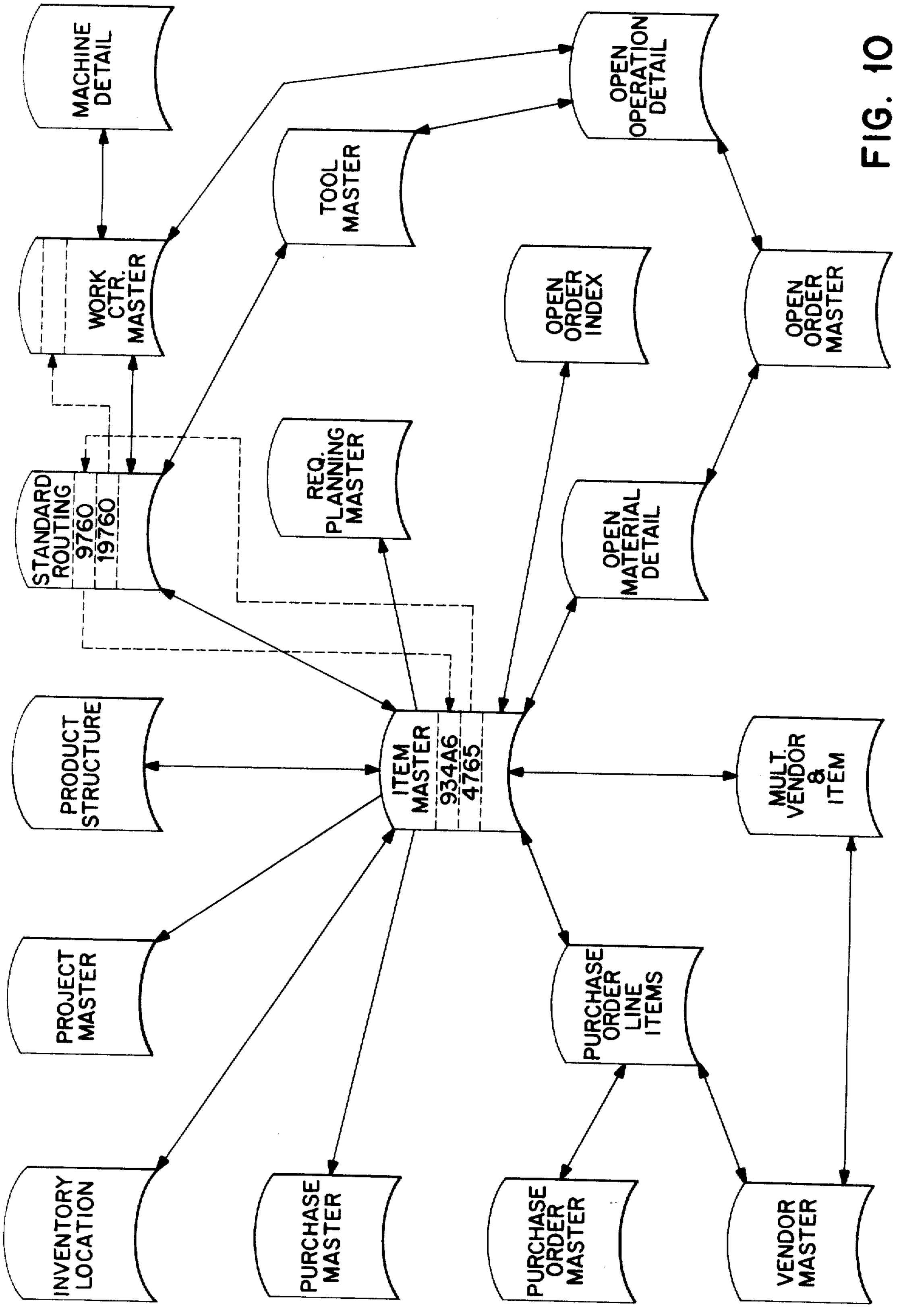
FIG. 10 is a diagrammatic illustration of a large data base system which can make use of the improvement of the present application.

FIG. 10 shows the interrelationships of various types of data needed for processing work center loading, start and end dates for operations, etc., in manufacturing organizations.

Currently the data file organizations employed in this type of application include a number of address fields which point to specific, related members in the respective files. For example, a Standard Routing Record might contain the following addresses:

1. An address (9760 in FIG. 10) of the Item Master Record (in Item Master file) for the item whose routing of various machine operations is specified.
2. An address of the next operation record in this routing, i.e., a pointer to the information describing the successive machine operation for the item.
3. An address of the previous operation record in this routing.
4. An address (19760 in FIG. 10) of the Work Center Master record for this operation.
5. An address of the next operation record in the work center where-used chain.
6. An address of the previous operation record in the work center where-used chain.

Charts 1–4 illustrate by way of example additional data relationships for a sample production information control system shown in FIG. 10. Included is the chaining information contained in certain of the data files. A significant number of record addresses are included in the descriptions. Addresses are used to eliminate the necessity of an intermediate look up on name, which would be more convenient from a design and maintenance point of view, but which penalizes performance in today's technology. The address pointer problem is perhaps the main complaint which suppliers of processing equipment have against proposed data base systems.

CHART 1

OPEN ORDER MASTER

Chaining

Address of first material detail record.
Address of last material detail record.
Record count for material detail chain.
Address of first operation detail record.
Address of last operation detail record.
Record count for operation detail chain.
Overflow chain address.

Comments

This file will contain a summary record for each order, plus a record for each line on the face of the order. The file will be organized as a master file. It will appear as an item master to both the material detail and the operation detail file (both appear as routing files to this).

CHART 2

WORK CENTER MASTER

Chaining

Address of first work center where-used record (standard routing).

Record count for work center where-used record (standard routing).

Address of first work center where-used record (operation detail).

Record count for work center where-used record (operation detail).

Address of first work center where-used record (machine detail).

Record count for work center where-used record (machine detail).

Overflow chain address.

Comments

This file contains all information relative to the work center. It is organized as a master file. Three files are chained into from this file, two of which appear as counting files. They are the Standard Routing and the Operation Detail. The work center master looks like an item master to the machine detail file.

CHART 3

ITEM MASTER

Chaining

Address of first assembly component structure record.

Record count for assembly component chain.

Address of first assembly where used.

Record count for assembly where used.

Address of next item in activity chain.

Address (4765 in FIG. 10) of first routing operation record.

Address of last routing operation record.

Record count for routing chain.

Address of first material detail record in item master where-used chain.

Record count for item master where-used material detail chain.

Address of first open order index.

Address of last open order index.

Record count for open order index chain.

Address of first P. O. line item.

Address of last P. O. line item.

Record count of P. O. line item chain.

Address of first vendor index.

Address of last vendor index.

Record count of vendor index chain.

Address of projection master.

Address of purchase master.

Address of requirements planning master.

Overflow chain address.

Address of first inventory location record.

Address of last inventory location record.

Record count for inventory location chain.

CHART 4

TOOL MASTER

Chaining

Address of first Tool Master where-used record (standard routing).

Record count for Tool Master where-used record (standard routing).

Address of first Tool Master where-used record (operation detail).

Record count for Tool Master where-used record (operation detail).

Overflow chain address.

Comments

This file will contain all information relative to tooling. It is organized as a master file (like work center) with both the standard routing and the operation detail file appearing as routing files to it.

The programs which process the information contained in these files use the addresses of the various related data records in order to access further data.

Addresses are contained in these data records as opposed to symbolic names of operations, vendors, etc., for performance reasons in the current file and storage technologies, i.e., such an implementation avoids the delay which would be required to convert a symbolic name to a physical address.

One of the intents of the invention is to provide the same logical capability of interrelating items in various data files, but without requiring the use of specific addresses.

While the improved associative approach may not result in the complete demise of data addressing problems, it provides a mechanism for minimizing addressing problems considerably. Today we do not have a means for fast resolution of names to location, or in cases where it is attempted, large amounts of fast storage are dedicated to index table entries (as in cylinder indices, etc., for ISAM files); even so there is no fast refill capability where the core available is not large enough for all entries. Techniques for randomizing keys to location (addresses) have been used for quite some time, but the user is faced with the synonym problem, etc., as described by W. Buchholz, in "File Organization and Addressing," IBM Systems Journal, June 1963.

The improvement of the present application provides one solution for minimizing these problems.

While the invention has been particularly shown and described with reference to preferred embodiments thereof, it will be understood by those skilled in the art that the foregoing and other changes in form and details may be made therein without departing from the spirit and scope of the invention.

We claim:

1. A method of operating a processing system having a plurality of storage units comprising the steps of providing holograms at least some of which store data for each of a plurality of said storage units, and changing the entire contents of each of said storage units simultaneously by steps including addressing a desired storage unit, electrically conditioning the desired storage unit to respond to light patterns impressed thereon, and concurrently controlling a coherent light source and different holograms of an array to generate different light patterns corresponding to the holograms and to direct the patterns upon light responsive devices in all storage units for simultaneously switching the multistable cells of the electrically conditioned storage unit to states corresponding to the light patterns.

2. The method of claim 1 wherein one of the storage units is content addressable, said method further comprising the step of
searching the entire contents of the one storage unit simultaneously for desired data, whereby data directories and tables can be searched a page at a time in two system cycle times.

3. A method of operating a processing system having a plurality of storage units comprising the steps of
controlling a coherent beam of light to provide a plurality of different beam orientations,
providing holograms, each storing a plurality of pages of data, each page of data having in the order of at least several hundred bits, the pages in each hologram being adapted to be written into respective ones of the storage units,
generating different light patterns corresponding to the hologram data pages for the different beam orientations and directing the patterns to impinge upon light responsive devices in the storage units, and
concurrently electrically conditioning one of the storage units to respond to the pattern impinging thereon to simultaneously change the entire contents of the conditioned unit.

4. A method of operating an associative memory processing system having a plurality of content addressable storage units comprising the steps of
controlling a coherent beam of light to provide a plurality of different beam orientations,
providing holograms, each storing a page of operands, a page of control word routines and a page of function tables for entry into first, second and third ones of the storage units,
generating different light patterns corresponding to the hologram data pages for the different beam orientations and directing the patterns to impinge upon light responsive devices in the first, second and third content addressable storage units, and
concurrently electrically conditioning one of the first, second and third storage units to respond to the pattern impinging thereon to simultaneously change the entire contents of the conditioned unit.

5. In a data processing system wherein programs are executed by first means including microprogram routines,
a microprogram paging mechanism comprising
a holographic array for storing the routines,
a plurality of storage units, each for storing selected ones of the routines and each including different light responsive elements for controlling the states of each of a plurality of multistable cells forming the unit,
second means including the array and a controllable coherent light source responsive to the first means for directing light patterns corresponding to holograms in the array to impinge on the elements of the storage units simultaneously, and
third means electrically conditioning one of the storage units to respond to the pattern impinging thereon to change the routines in the one storage unit in parallel.

6. In a program-controlled associative memory data processor of the type
in which separate content addressable storage units are provided for storing indicia of the types including operands, control word routines and arithmetic and logical function tables and in which means including identification tags stored in the units control the operation of the units to process operand data in accordance with the routines and tables,
the combination of said units with apparatus for changing the entire contents of each of a plurality of said storage units in parallel, said apparatus including
light responsive elements in each of said plurality of storage units for controlling the state of each bit storage position thereof,
a holographic array including a plurality of holograms each of which stores one or more of said types of indicia,
means including the holographic array and a coherent light source for directing light patterns corresponding to holograms in the array to impinge on the elements of the storage units simultaneously, and
means for electrically rendering a selected storage unit responsive to the light pattern impinging on its light responsive elements to switch the states of its bit storage positions according to the pattern.

7. In a data processing system of the type wherein pageable program and data indicia, of the types including system control program segments, microprogram routines, application program segments, and table and index data is paged from peripheral devices into storage unit locations directly accessible to processing means in accordance with address information provided by the system, and
wherein the indicia paged into each storage unit is thereafter accessed by the processing means independent of the paging,
a paging mechanism comprising
a plurality of storage units for storing different types of the pageable indicia,
each storage unit having a plurality of multi-stable electronic cells for storing data bits,
means responsive to certain of said address information for selectively activating the cells of a desired one of the storage units,
the cells including light responsive devices responsive to different light patterns applied thereto for switching activated cells to stable states corresponding to the light pattern applied thereto,
a holographic array including a plurality of holograms, each storing each of the different types of pageable indicia,
a source generating a coherent beam of light, said source being controllable to provide a plurality of different beam orientations,
means responsive to other of said address information for controlling the source to provide said different beam orientations, and
said holographic array responsive to said different beam orientations for generating different light patterns and directing each portion of said patterns corresponding to a different type of pageable indicia to impinge upon the light responsive devices of a corresponding storage unit to switch the activated cells of the desired storage unit to stable states in accordance with the patterns generated.

8. The paging mechanism of claim 7 wherein the holographic array comprises holograms storing only those pages of indicia in the system having the highest frequency of use.

9. The paging mechanism of claim 7 further comprising
electrically operable means producing search/read cycles for one of said storage units,
said one of said storage units being a content addressable memory having its cells arranged to form a plurality of words, each word including a search argument portion and an output data portion,
said one storage unit including electrically operable means effective during one search/read cycle to search the entire unit for a desired search argument and to read out the corresponding output data portion if the desired search argument is found.

10. In a data processing system including a processor and address generating means,
a paging mechanism comprising
a holographic array for storing in each of a plurality of holograms thereof a plurality of pages of data,
a plurality of storage units each having a data storage capacity smaller than that of the array and each including different light responsive elements for controlling the states of each of a plurality of multistable cells forming the unit, each of the units adapted to store a respective one of said pages of each hologram,
means including the array and a controllable coherent light source responsive to the address generating means for directing light patterns corresponding to holograms in the array to impinge on the elements of the storage units simultaneously, and
means responsive to the address generating means for electrically conditioning the cells of one of the storage units to respond to a pattern impinging thereon for setting the conditioned cells to stable states corresponding to the pattern, thereby entering a respective page of data into the one storage unit in parallel.

11. The paging mechanism of claim 10,
said array being comprised of read-write holograms, and
said paging mechanism further comprising
electro-optical means for selectively changing the data in the holograms of the array.

* * * * *